[19] United States Patent
Hext

[11] Patent Number: 4,486,938
[45] Date of Patent: Dec. 11, 1984

[54] PROCESS OF REMANUFACTURING PUMP CYLINDER LINERS

[76] Inventor: Billy R. Hext, 1214 Terrace Cir., Odessa, Tex. 79761

[21] Appl. No.: 246,091

[22] Filed: Mar. 20, 1981

[51] Int. Cl.³ .................. B23P 7/02; B22D 11/126
[52] U.S. Cl. ............................ 29/402.06; 29/401.1; 29/402.07; 29/527.6
[58] Field of Search .......... 29/402.06, 402.07, 402.04, 29/402.01, 402.03, 402.08, 402.05; 29/156.4 WL, 527.6, 401.1

[56] References Cited

U.S. PATENT DOCUMENTS

| | | | |
|---|---|---|---|
| 1,814,267 | 7/1931 | Swartz | 29/156.4 WL |
| 1,842,441 | 1/1932 | Yount | 29/156.4 WL |
| 2,118,317 | 5/1938 | Mader | 29/156.4 WL |
| 2,134,753 | 10/1938 | Seyvertsen | 29/402.07 |
| 2,163,885 | 6/1939 | MacClatchie et al. | 29/156.4 |
| 2,412,587 | 12/1946 | Larson | 309/3 |
| 2,435,837 | 2/1948 | Larson | 309/3 |
| 2,686,091 | 8/1954 | Young | 309/3 |
| 2,832,653 | 4/1958 | Wilson | 29/156.4 WL X |
| 3,090,322 | 5/1963 | Mettersheimer, Jr. | 29/402.06 |
| 3,220,101 | 11/1965 | Roy | 29/401 |
| 3,238,604 | 3/1966 | Reinarz | 29/156.4 |
| 4,153,983 | 5/1979 | Stockton | 29/456 |
| 4,227,292 | 10/1980 | Kipling | 29/402.06 |

Primary Examiner—Howard N. Goldberg
Assistant Examiner—V. K. Rising
Attorney, Agent, or Firm—LeBlanc, Nolan, Shur & Nies

[57] ABSTRACT

A process of remanufacturing drilling fluid pump cylinder liners to increase the liner working life and to improve the same involving the steps of: procuring a used liner having a hard metal alloy inner layer from a pump cylinder, and removing portions of the interior metal surface so as to form an enlarged diameter, accurately dimensioned cylindrical surface in the liner. The remanufactured liner is then supplied for use with a specially manufactured piston having an enlarged diameter. Sequential remanufacturing steps can be carried out following several pumping and use cycles so that an orginal liner can be remanufactured multiple times. Prior to the procuring step, the worn liner can be checked while it is retained in the pump cylinder to determine whether extraction is necessary. If desired, the liner can be cleaned by a number of procedures and the outer diameter and configuration checked and, if necessary, resurfaced to restore the original outer surface dimensions. The metal removing step is carried out by honing or by internal grinding.

42 Claims, 4 Drawing Figures

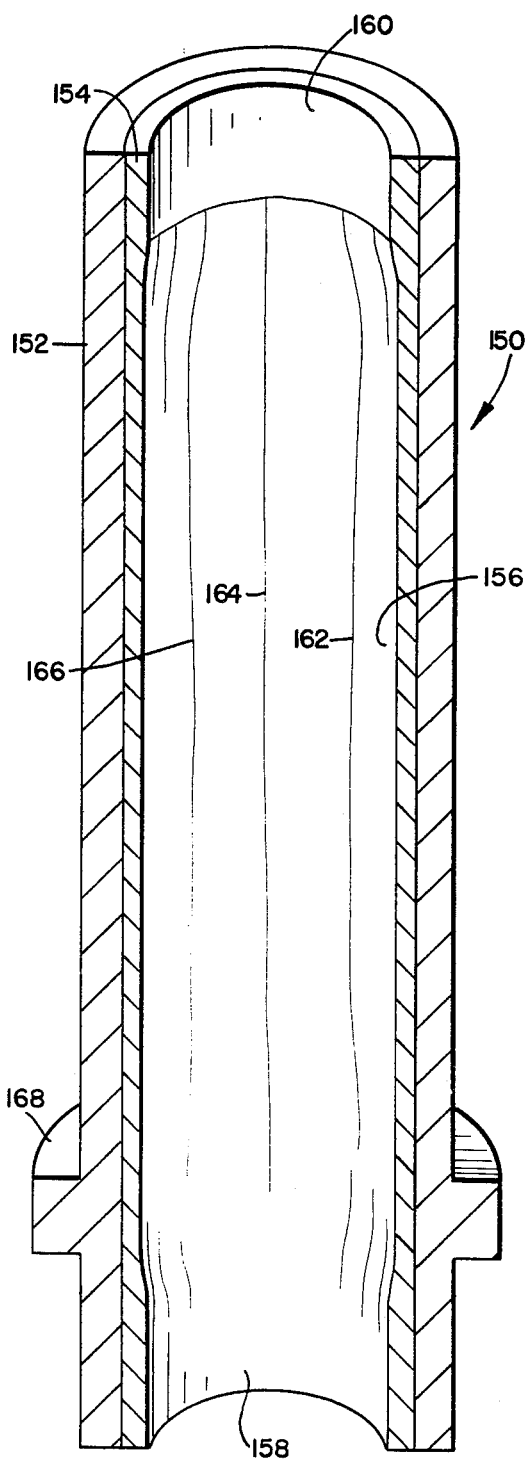
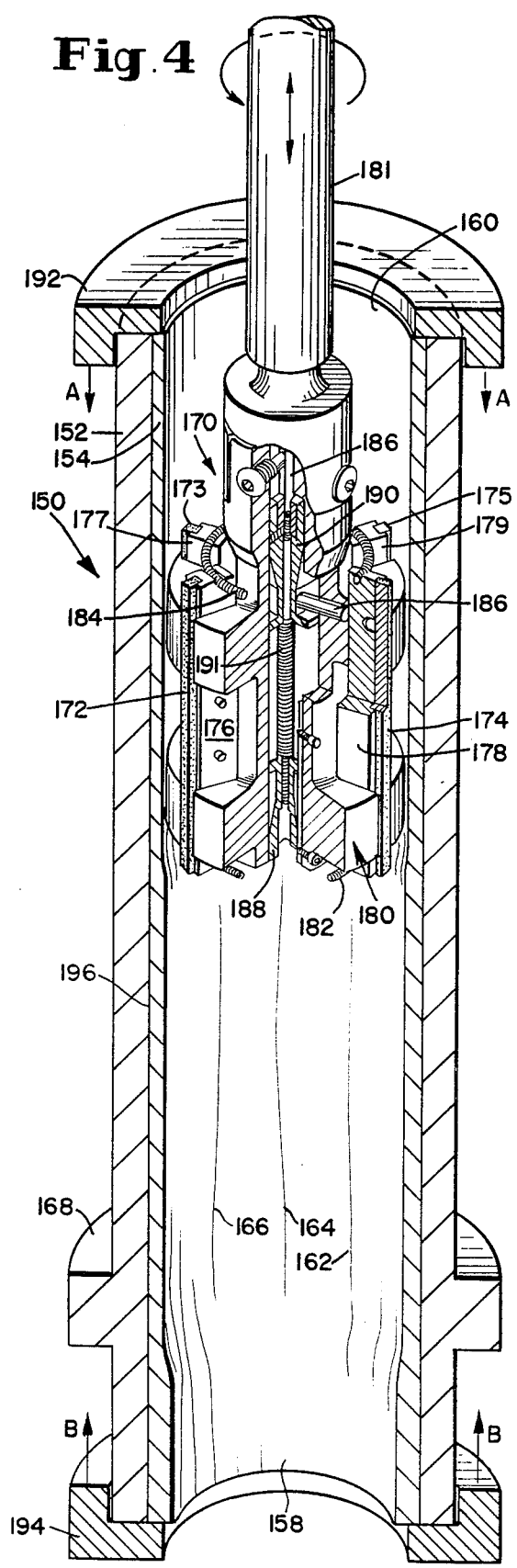

PROCESS OF REMANUFACTURING PUMP CYLINDER LINERS

BACKGROUND OF THE INVENTION

The present invention relates to a remanufacturing process for extending the working life of cylinder liners used in fluid pumps in the oil, gas, and water drilling industries. The process is carried out by performing a number of manufacturing steps during which a worn cylinder liner is reformed and improved to produce a usable liner which provides an extended period of service.

There are three basic types of fluid pumps used in oil and gas exploration drilling rigs and in water well drilling equipment. In the oil and gas drilling rigs, these are referred to as "mud pumps" and are generally of two types: (a) a duplex pump which has two reciprocating pistons which force fluid into the discharge line and (b) a triplex reciprocating pump in which three pistons act to force fluid into the discharge line. "Multiplex pumps" is a generic term which is occasionally used to include triplex pumps and those having up to six cylinders. These fluid pumps can be single acting in which fluid is discharged on alternate strokes or double acting in which each stroke discharges fluid.

The fluid pumps involved in this invention are of the horizontal reciprocating type in which one end is termed the fluid end and the other end is designated the power end. The fluid end consists of a pump housing in which are fitted a number of cylinders corresponding to the number of pistons which are operated within the pump. The power end of the pumps contains a power source and connecting rods designed for supplying reciprocal driving force.

Each pump cylinder contains a liner within which the piston operates over its power stroke. Other fluid end pump parts are rods, valve pots, seats, gaskets and piston rubbers. The liner and some of these parts are referred to as expendable elements The cylinder liner is subject to high wear rates due to a large number of factors such as the geological formation being drilled, the solids content in the fluid, the abrasive properties of the solids, and pH of the fluid, the pump pressure, strokes per minute of the piston, and the materials used in the various pump parts.

The pump cylinder liner in a duplex pump typically has an average life of 1200 to 1500 pump hours, that is about 90 to 100 days, and the average life of the cylinder liners in the triplex pumps is about 500 to 900 hours or about 50 to 60 days of service life at a normal duty cycle. The usual maintenance practice for fluid pumps is then to replace the fluid end expendable parts at the end of their respective service lives. This practice, however, has grown relatively expensive since about 50% of the total maintenance cost is in the cylinder liners which range in price from about $400 to $1400. Thus, replacement of liners in a large sized triplex pump could run three times the larger amount. The average liner costs are; however, less since these are estimated to be $750 for each duplex liner and $650 for a triplex liner.

About 90% of the liners sold in the U.S. at the present time are known as "premium liners" in which a alloy steel outer hull has an inner surface layer of a wear resistant chromium alloy. Such hard surfaced cylinder liners are priced in the mid to upper end of the above price range. Other "nonpremium" liners are fabricated from mild steel and have only a heat hardened inside diameter, I.D., surface. The replacement of the cylinder liners at the end of each 50 to 100 days of the service cycle results in high pump maintenance costs.

The liner replacement market in the U.S. and Canada is about 110,000 to 120,000 liners per year. Statistical maintenance data has shown that the average number of liner changes per year for a triplex pump is 7.2. At this level of use 23 liners/year are required for a cost of approximately $15,000.00 while the additional maintenance charges amount to another $15,000.00. Part of the high liner replacement cost is due to the chromium content in the scrapped premium liners which is not recovered. Each of the worn liners contains about 12 to 15 pounds of chromium. The wear resistant chromium alloy is about 28% chromium with other elements being magnesium, vanadium, and molybdenum. The chromium alloy inner surface has a hardness of 62 to 65 on the Rockwell C scale and is a wear and corrosion resistant metal surface which is heat treated.

The premium pump cylinder liners with the chromium alloy inner surfaces are manufactured by the three principal processes of (a) bi-metal centrifugal casting; (b) shrinking a wear-resistant chromium iron or stainless steel alloy sleeve into the liner and (c) chrome alloy plating the inner surface of an alloy steel liner hull. Other seldom used methods of producing premium liners are those in which hard surface treatments are used for the steel hulls. These consist of coating the inner surface of the liners with a hard metal using such techniques as plasma arc spray or powdered metallurgy surfacing. These treatments produce a wear-resistant layer of about 0.020 inch in thickness with an additional thickness of an impregnation layer within the hull metal. The alloy steel liner hulls used for these manufacturing processes are usually fabricated from 4130 to 4150 steel alloy. The mild steel nonpremium liners are usually made of 0.50 percent carbon steel in which the inner surface has been heat hardened. Such nonpremium liners do not have hard metal inner surface layers.

An interesting property of the bi-metal cast and sleeve liners which are both centrifugally cast is that the chromium alloy is believed to be more dense and of a composition closer to the theoretical specifications at the cast interface. This results in the metal just inward toward the liner axis from the interface area being even more wear resistant than the inner-most I.D. surface of a new premium liner.

The pump liner is designed to fit into the cylinder which is formed in the fluid end housing of the pump and is retained in the housing by a liner cage and retainer arrangement. The reciprocating piston consists of a metal piston core having one or more flanged hubs and a piston rubber which is retained in the gap between the flanges. The outside surface of the piston rubber contacts the inner surface of the liner. Various types of wear occur on the liner and the piston body. Streaking of the liner bore and the piston rubbers is generally caused by aggregate, sand or other abrasive or foreign materials in the drilling fluid. A pitted liner indicates corrosive conditions, usually found for acidity levels below 7.2. pH. A concentration of wear on one side of the piston; or liner can occur if various working conditions such as loose cross head slides, worn pump bores, snuffing boxes and junk rings misalignment and unequal tightening of the liner rod packing have occurred.

Pump failure is generally indicated by excessive clearance between the piston flange and the liner wall.

The permissible clearance prior to replacement of the fluid end expendable parts depends upon the operating pressure. In low pressure service (less than 850 psi) the total clearance may be 3/32 inch or more. At medium to high pressure (850 psi to 1600 psi) a 1/16 inch clearance is regarded as the limit. At higher operating pressures of from 1600 psi to 3200 psi a clearance of 0.04 inch is considered to indicate a "worn out" piston and/or liner. At medium to high pressures the indication of normal wear in a duplex pump is between 0.06 to 0.08 inches over nominal I.D. and in a triplex liner is 0.035 to 0.06 over nominal. The clearance dimension must be taken in the center of the liner since the wear occurs in the midportion rather than at the ends of the liners. The continued use of the pump beyond these clearance dimensions will result in a short service life for the piston rubbers.

As the piston fails, there is high velocity fluid slippage between the piston flange and the liner bore. With a slow failing of the piston or if a failed piston is allowed to operate in the pump, this jetting fluid will cause wash cut damage to the piston flange and liner bore and the dragging of the piston flange in the bore at 180° from the wash cut. The pump efficiency and the length of service life rapidly decrease with increasing piston flanges-to-liner clearance. For example, if the clearance is 0.040 at 3000 psi, a set of replacement rubbers can be expected to last only 50 percent as long as they would on a new piston in a new liner with a clearance of 0.010 inch.

The wearing of the piston and the liner can not be eliminated due to the abrasive nature of the fluids, the corrosive properties of the same, and the high operating pressure utilized in fluid pumps in the drilling industry. The required replacement of the cylinder liners results in a continual high cost of operation for these fluid pumps.

U.S. Pat. No. 2,163,885 to MacClatchie et al describes fluid pump liners and a method of fabricating the liners in which flanges are joined to cylindrical pipe sleeves. There is no disclosure of removing the worn liners from the fluid pumps in order to remanufacture the same. Rather the worn liners are simply replaced. This patent does not therefore describe a process for remanufacturing and thereby increasing the working life of a cylinder liner.

U.S. Pat. Nos. 2,412,587 and 2,435,837 both to Larson are directed to increasing the inner diameter (I.D.) of master and wheel cylinders and then inserting a tubular sleeve in order to produce the original I.D. dimension. There is no disclosure in this patent of remanufacturing a removable liner for the brake system cylinder.

It is known from U.S. Pat. No. 1,842,441 to Yount to rebore engine block cylinders and insert cylinder sleeves or liners and to then bore the new liners to the desired size for the piston to be installed. There is no use of an extracted cylinder liner in this process.

U.S. Pat. No. 2,686,091 to Young describes various methods of making pump liners using concentric sleeves, the inner one of which is usually hardened for greater resistance to wear and for longer life. There is no mention in this patent of remanufacturing the liners by reboring or grinding.

Other U.S. Pat. Nos. in this general art are: 2,133,403 to Rubin; 2,832,653 to Wilson; 3,220,101 to Roy; 3,238,604 to Reinharz; 4,153,983 to Stockton and 4,227,292 to Kipling. The latter of these patents describes a process for remanufacturing a brake master cylinder in which the interior bore of the cylinder housing is enlarged and a sleeve pressed therein which is subsequently honed to a smooth finish. The sleeve is not honed outside of the brake cylinder and the various process steps preclude such a step. These patents do not describe remanufacturing processes wherein worn pump cylinder liners are extracted from pump housing and thereafter remanufactured in a manner which allows increasing of the working life of the cylinder liner.

It has been previously known during an earlier period when nonpremium mild steel liners were extensively used in mud pumps that the liners were sometimes removed from the pumps and bored out to the next commercially available piston size. Such metal boring and reuse of liners is not possible and to applicant's knowledge has never been practiced with the currently used premium liners because the wear-resistant metal alloy inner layer in such liners is so hard that destruction of the liner and/or the bore tool would occur.

The present invention provides a process of remanufacturing pump cylinder liners used in drilling fluid pumps in order to extend the working life of the liners and thus reduce operating and maintenance costs. New pump liners are manufactured with bores sized 3 inches to 8 inches and in stepped ¼ inch increments, although most production is of the one-half inch increment sizes. The American Petroleum Institute (API) has a 0.010 inch tolerance on these parts. Examples are as follows:

| Liner Size | Nominal Dimension, inches |
| --- | --- |
| 3" | 3.000 to 3.010 |
| 3¼" | 3.250 to 3.260 |
| 3½" | 3.500 to 3.510 |
| 3¾" | 3.750 to 3.760 |
| 4" | 4.000 to 4.010 |
| 4¼" | 4.250 to 4.260 |
| 4½" | 4.500 to 4.510 |
| 4¾" | 4.750 to 4.760 |
| 5" | 5.000 to 5.010 |

The outer diameters of the liners are established by the design of the particular pump and vary between the triplex and duplex pump types. The liner cage and retainers also vary depending upon the horse power of the pump, the length of the stroke and other design features.

SUMMARY OF THE INVENTION

A process of remanufacturing drilling fluid pump cylinder liners to thereby increase the liner working life is set forth. The process involves the steps of: procuring a used liner having a hard metal alloy inner layer from a pump cylinder and removing portions of the interior metal surface from the liner so as to form a enlarged diameter, accurately dimensioned cylindrical surface therein. An enlarged diameter, specially manufactured piston is then supplied for use in the remanufactured liner. Prior to procuring the worn liner its I.D. can be checked while the liner is retained in the pump to determine whether or not extraction is necessary. Also prior to the metal removing step, the liner can be cleaned by a number of procedures and the outer diameter can be checked, and if necessary, resurfaced to restore the original outer surface dimensions.

The metal removing step is carried out by honing or by internally grinding the liner to produce an enlarged cylindrical interior surface. Honing is preferred since grinding has been found to require longer preparation time for the wear-resistant hard metal inner surface layer of the liners. Prior to and during the metal removing step the liner axis is aligned with and clamped with respect to a honing or grinding apparatus. The amount of metal removed is sufficient to eliminate the center-to-end wear curvature in the liner. It is preferred to remove sufficient material so that the enlarged diameter is 0.100 inch over the original nominal size of the liner as employed in the fluid pump prior to the extraction of the liner.

The remanufactured liner is then supplied for use in a fluid pump with a specially sized piston. The removal of only 0.100 inch from the I.D. permits multiple remanufacturing cycles in order to extend the working life of the same liner in accordance with the invention hereof. Two or more such multiple remanufacturing cycles can be safely carried out on the pump cylinder liners disclosed herein. In the cases of the chrome plated and the hard coating treated liners intermediate plating and coating steps are performed during the successive remanufacturing cycles. The liners manufactured with shrunk-in sleeves and by bi-metal casting are preferably remanufactured according to the present invention by successive metal removal cycles.

The present remanufacturing process for producing pump cylinder liners reduces drilling fluid pump maintenance costs to about 75% of the costs when the liners are only replaced when worn to the limit of usefulness. This amounts to a savings of about $250 to $300 per liner reinstalled. The process saves scarce chromium all of which is imported into the U.S. and saves the energy expended in the original manufacture of new liners from the ore reduction through the various finishing steps.

The remanufacturing process uses as one of its input factors a worn liner which is often in the correct general form but which is regarded as a disposable fluid end component in the drilling fluid pump.

It is therefore an object of the present invention to provide a process of remanufacturing and thus increasing the working life of a cylinder liner which is then positioned for use in a drilling fluid pump.

Another object of the present invention is to provide a process of remanufacturing a worn pump cylinder liner in which the internal, worn portions are eliminated by the removal of about 0.100 inch of metal based on the nominal diameter size of the liner prior to the wearing action.

Yet another object of the present invention is to provide a process as above described wherein the extent of wear in the liner can be checked prior to extracting the liner from the pump and wherein the surface condition of the liner can be evaluated prior to the removal of worn portions of metal from the interior surface in order to form an enlarged diameter interior surface.

Another object is to provide a process of refitting a drilling fluid pump with a remanufactured liner in which a worn pump liner is extracted from a pump cylinder and the I.D. enlarged to eliminate the worn areas.

Yet another object is to provide a process for making an improved pump liner wherein wear-resistant surface metal is removed from the I.D. of a worn liner to uncover and present a more dense and hence more wear-resistant metal surface for contact by the pump piston.

Specific preferred embodiments of the invention will be described below with reference to the appended drawing figures by which the described and claimed process will be more readily understood.

BRIEF DESCRIPTION OF THE DRAWINGS

FIG. 3 shows a cut-away cross-sectional view of a worn pump liner in which the hard metal inner layer has been accentuated; and FIG. 4 shows the worn pump liner of FIG. 3 aligned with a honing apparatus for removal of metal from the interior surface in order to form an enlarged diameter cylindrical surface therein.

DESCRIPTION OF THE PREFERRED EMBODIMENTS

Figure 1:
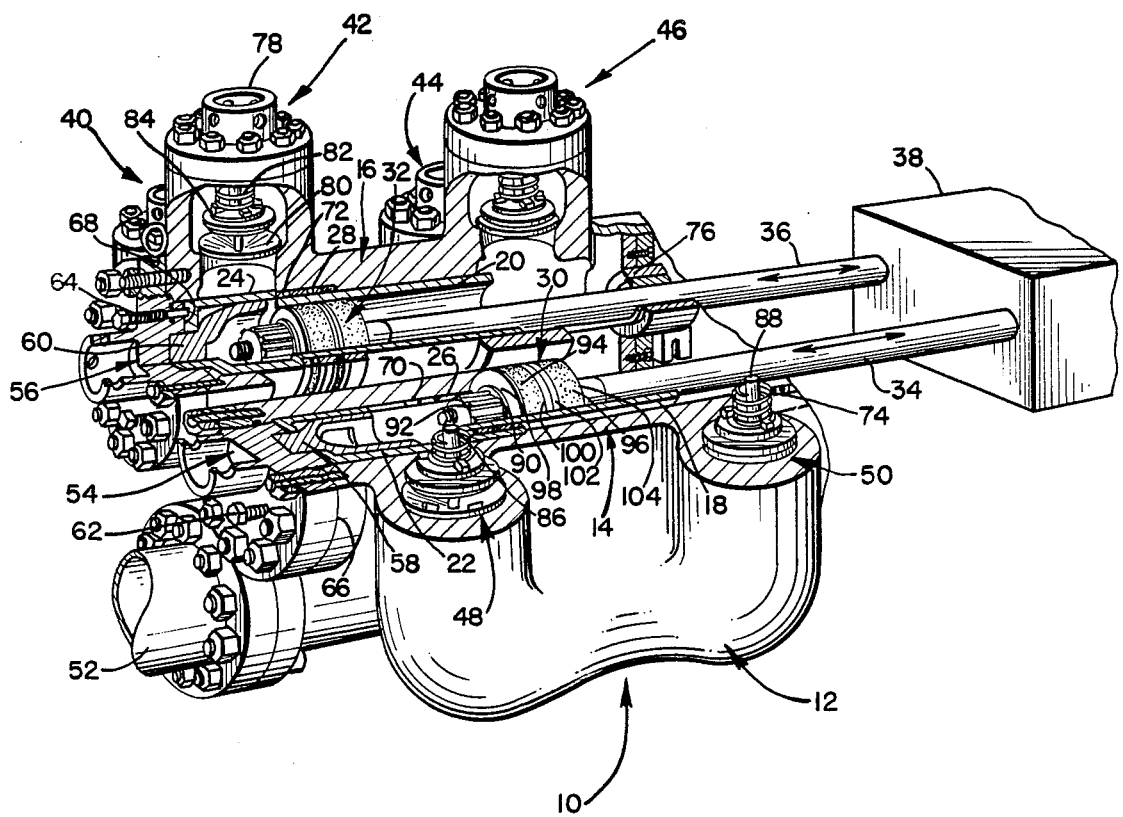
FIG. 1 shows a cut-away perspective schematic view of a double acting duplex fluid pump.

The process of the present invention can be described with respect to the figures described above. FIG. 1 shows a double-acting duplex pump 10 which consists of a fluid end pump housing 12 having a first cylinder 14 and a second cylinder 16 formed therein. Each of the cylinders contains a cylinder liner 18 and 20, respectively. The cylinder liners are retained by cages 22 and 24 respectively which engage retaining rings 26 and 28.

Pistons 30 and 32 are reciprocated by piston rods 34 and 36 through power delivered from the power end 38. In operation, the pistons reciprocate within the inner surfaces of the cylinder liners 18 and 20 and thus cause the liners to wear. The wear is not uniformly distributed across the entire length of the inner diameter surface but rather is concentrated in the midportion of the liner as will be hereinafter further detailed. In the double-acting pump illustrated, fluid suction valve pots 40 and 44 and discharge valve pots 42 and 46 are located at respective ends of each cylinder liner 20. In this construction each stroke of the piston 32 causes fluid to exit from either of the valve pots 42 or 46. In the position shown, the next stroke of the piston will cause fluid to flow through the discharge pot valve 46. At the same time, the suction created by piston 32 as it moves through the liner 20 will cause fluid to be taken in through suction valve pot 40. The valve pots 42 and 46 are located above the cylinder 16 while the suction valve pots 40 and 44 are positioned at the side of the cylinder 16. Corresponding suction valve pots 48 and 50 are shown for the second cylinder 14 but the coating discharge pots associated with these two suction pots have been removed in the cut-away illustration.

Piston 30 operates in the same manner as previously described with respect to piston 32. An intake line 52 is shown mounted in the bottom portion of the pump housing 12 for communication with the suction valve pots 40, 44, 48 and 50.

The two cylinders 14 and 16 are constructed with cylinder heads 54 and 56, respectively, which removably retain cylinder head covers 58 and 60 as well as the liner cages 22 and 24. A series of liner packing adjustment bolts 62 and 64 are provided to adjust the pressure on the cylinder head packing 66 and 68. Liner packings 70 and 72 in the form of ring packing glands are provided between the cages 22 and 24 and the retaining rings 26 and 28. The reciprocating rods 34 and 36 move through stuffing boxes 74 and 76 which are suitably equipped with junk rings, packing and gland nut fittings.

As shown for valve pot 42 the valve pots 40, 42, 44 and 46 consist of a valve cover 78, a valve seat deck 80, a valve spring 82 and a valve 84. As seen in valve pots 48 and 50, valve guides 86 and 88 are uniformly provided for each of the valves.

The piston 30 is formed of a cylindrical metal core 90 retained on the end of piston rod 34 by a retainer bolt 92. Piston rubbers 94 and 96 are shown retained between flanges 98, 100, 102 and 104.

According to the process of the present invention, the condition of wear on the interior surfaces of liners 18 and 20 is inspected by first interrupting the power supply 38 and then withdrawing the pistons 30 and 32 toward the power end 38. The cylinder heads 54 and 56, the cylinder head covers 58 and 60, and the liner cages 22 and 24 are also removed in order to insert a measuring micrometer into the liner while it is still retained in the pump housing 12. Accurate measurement of the extent of wear and inspection for wear grooves, streaking of the liner bore and washed cut damage can be carried out in this manner at a low service cost level.

When a determination is made that the permissible wear clearance has been exceeded the following preferred method steps are then carried out:

1. One or both of the liners 18 and 20 are extracted by suitable pulling equipment.

2. The procured liners are cleaned on both of the inner and outer surfaces by one or a combination of (a) shot blasting with pellets, (b) sand blasting, and/or (c) cleaning with a solvent.

3. The inside diameter of the liners is then evaluated to determine whether or not a sufficient thickness of the hard surface alloy metal exists to permit enlargement of the I.D. during the formation of a reformed cylindrical inner surface.

4. The extent of wear on the outer surface of the liners 18 and 20 is inspected to determine whether or not the degree of wear in the packing areas, flanges, or ends of the liner will interfer with the subsequent steps in the remanufacturing method.

5. If the outer surfaces are sufficiently worn or out of dimensional specification, these surfaces can be built up with weld, spray metal, or cold metal applications while internally cooling the liner which has an intact inner hard metal alloy sleeve. The liner is subsequently machined to reproduce the manufacturer's external liner specifications prior to enlarging the inner diameter. An engine lathe or a turret lathe can be used for this machining step. In this machining, internal chuck jaws can be employed for holding the liners since these liners will be chucked on the outer end portions of the I.D. where no piston wear has occurred. In this manner, any buildup of metal and subsequent machining will be concentric with the original bore and the O.D. of the liner.

6. Prior to and during the removal of metal from the outer or the inner surface the liner axis is aligned with the working axis of a surface metal removal device.

7. Portions of the interior hard metal surface layer are then removed to form an accurately dimensioned cylindrical I.D. surface. This step is carried out by honing and/or internal grinding in which the liner is centered and held or clamped on the honing or grinding machine by adapter flanges which are pressed against the two ends of the liner. The centering is carried out by aligning the axes of the liner and the metal removal head of the machine. Metal is removed on the I.D. of the liner in order to obtain an I.D. of +0.100 inch over the nominal size of the original liner, that is, +0.050 inch is removed from the cylindrical wall surface. If this increase in I.D. is insufficient to clean out any wear grooves and the central wear zone in the liner, additional material can be removed. This step is carried out by good machining practices to obtain a maximum of 16 rms finish.

8. In this process, the American Petroleum Institute (API) specifications permit a 0.010 inch tolerance on the I.D. of the liner and the piston. Hence, after the liner is honed or grounded to the enlarged size it is rechecked to make sure the I.D. is within specifications between +0.100 to +0.110 inch over the original nominal size and to assure that the 0.D. is concentric with the I.D. Any additional removal of metal from the outer surface can occur following this step.

9. The liner is then painted, crated, and supplied with the proper sized piston so that a nominal sized piston matching the original liner will not be used by mistake. The piston hub is sized at −0.005 inch under the enlarged diameter. Thus an enlarged piston designed for 5.600 inches has an upper hub size of 5.595 inches which is the largest diameter of the metal parts of the piston.

Enlarged diameter pistons to fit the remanufactured liners can be produced by known manufacturing processes. These pistons will be sized from +0.100 to +0.110 inch over the nominal size pistons. These specially sized pistons can be packed with the remanufactured liner. The removal of only +0.100 inch of material from the inner surface allows multiple remanufacturing cylces with the same liner as above stated.

Of this preferred process, steps 1 and 7 are required, in principal, to effect remanufacturing and subsequent use of the liner. The remaining steps are desirable according to the field practice.

As a specific example of the removal of internal hard metal alloy, two National 12-160 liners were honed out. The worn portions of the liners measured 6.528 and 6.530 inches I.D. prior to the removal step. Metal was then honed out to produce a I.D. of 6.603 and 6.602 inches which was within 0.004 inch tolerance of being concentric with the 0.D.

It is not possible to use broaching or boring for removing metal from the I.D. of the liners since the wear-resistant metal inner layers are too hard. It has been found that broaching and/or boring will crack the bimetal or cast sleeves of hard metal alloy and can cause unacceptable heat build-up and thus loss of the hardening temper of the metal alloy surface, or that the tools break.

Figure 2:
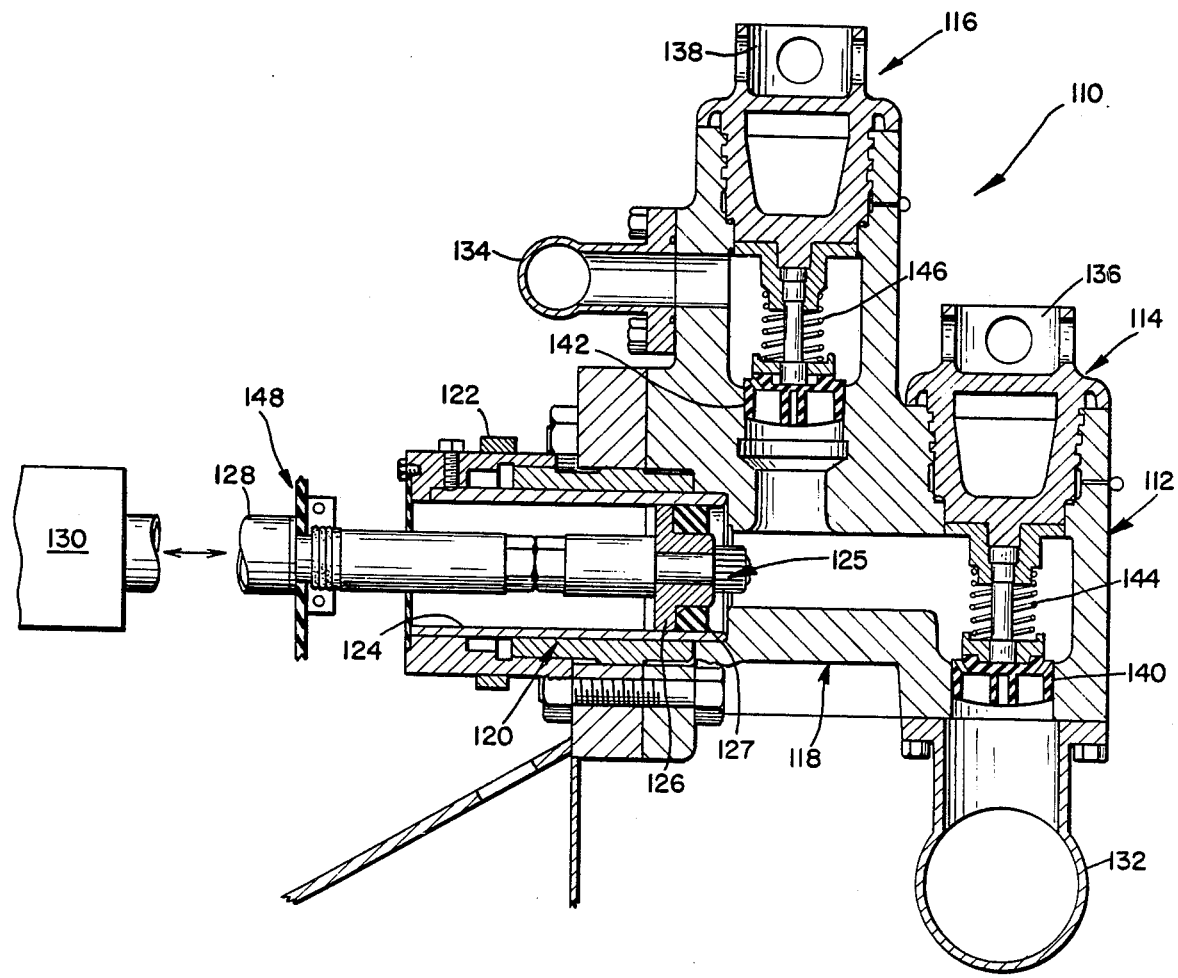
FIG. 2 shows a cross-sectional schematic view of an 'L' head single-acting fluid pump.

Referring now to FIG. 2 a pump 110 of an 'L' head design is shown constructed of a pump housing 112 having an intake or suction valve pot 114 and an outlet or discharge valve pot 116 arranged therein together with a fluid cylinder 118, a retainer sleeve 120 and a liner retention arrangement 122 which holds liner 124 in an operative position within pump housing 112. A piston 125 having a hub 126 and a rubber 127 is moved by piston rod 128 reciprocally within the interior of liner 124 by a power source 130. A fluid intake line 132 is located in fluid communication with outlet valve pot 116. The construction of the valve covers 136 and 138, valve seats 140 and 142, valve spring 144 and 146 and of the piston 126 are similar to those elements described with respect to FIG. 1.

Fluid pump 110 is single acting in that fluid is drawn in through valve pot 114 on the stroke of the piston to the left hand side as illustrated and then fluid is ejected from the pump as the piston moves to the right hand side. The liner 124 can be inspected for the wear conditions by removal of piston 126 towards the power source 130 and unhitching the coupling 148. The liner is then remanufactured according to the above described steps.

FIG. 3 shows a cut-away view of a typically worn liner 150 which is constructed of a cylindrical outer carbon steel hull 152 and an inner hard surface alloy layer 154 which is formed of a chromium iron alloy. The outer hull 152 can be formed from a 4130 alloy steel. The hard surface alloy layer 154 is illustrated to be fabricated by a bi-metal or internal sleeve casting process. It is also possible to use one of the other processes set forth above in the Background section.

The wear area of the inner layer 154 is the internal surface 156 which is positioned to the interior from the two relatively unworn end portions 158 and 160. Wear grooves 162, 164 and 166 are illustrated in this central zone. The outer hull 152 is fabricated with a retaining flange 168 which varies in dimension and position along the longitudinal length of the liner 150 depending upon the specification of the particular pump manufacturer. Several of the manufacturers of these types of liners and of the fluid pumps described above are the National Division of Armco; EMSCO, a division of Youngstown steel; the Oil Well Division of U.S. Steel, and Gardner-Denver.

FIG. 4 illustrates the metal removing step of the present invention in which the worn liner 150 is honed out by a honing apparatus 170 which is schematically illustrated as having honing stones 172, 173, 174 and 175 supported on shoes 176, 177, 178, and 179, respectively. These shoes are retained by the honing head 180 which is attached to the end of the apparatus shaft 181 by retaining springs 182 and 184 and are designed to be forced outwardly by internal cams 188 and 190 which are mounted coaxial to shaft 181. These cams transmit force through pins illustrated by pin member 186 and are adjusted by rotation of screw 191. The liner 150 is chucked on a honing machine and centered with the working axis of apparatus 170 by top and bottom recessed flange adapters 192 and 194. Force is applied on the adapters in the direction of the arrows A and B in order to hold the liner in a secured and centered position with respect to honing head 180. The adapters 192 and 194 thus function as centering and holding means for the liner.

The honing apparatus 170 is designed to make multiple axial passes on the liner 150 in order to remove metal to produce the enlarged diameter inner surface therein. As illustrated this can be carried out by a vertically reciprocating and rotating honing head. The time required for the multiple honing passes is typically 30 to 120 minutes depending upon the wear condition of the worn liner.

The central wear zone in the internal surface of the liner 150 usually runs about 0.08 inch above the nominal I.D. found in the end portions, 158 and 160 in a duplex liner. The corresponding wear dimension in a triplex liner is 0.05 to 0.060 inch. This wear gap is then eliminated by removing metal from the inner surface sufficient to produce a 0.100 inch over nominal I.D. as stated above in the metal removing step illustrated in FIG. 4.

As stated above, the alloy composition near the wear-resistant layer and hull interface of bi-metal and sleeve cast liners denoted by parting line 196 in FIG. 4 is more dense and is closer to the theoretical specification of the alloy composition than is the bulk of the wear-resistant layer 154 which is removed by the honing apparatus. This results in the remanufactured liner having better wear-resistant properties than the original liner prior to use in the pump. Thus the present invention permits the fabrication of an improved liner by forming an inner surface of more wear-resistant metal.

The length of the liners illustrated by FIGS. 3 and 4 ranges from 12 inches to 28 inches and the I.D. range is from 3 inches to 8 inches.

The pump liners having chrome plated inner surface which account for about five percent of the unit volume in the liner market are preferably remanufactured in a slightly different manner. The used liner, once extracted from the pump cylinder is honed out to enlarge the diameter to 0.140 inch over the nominal size and replated to add on a 0.02 inch layer of new plate. Then the enlarged diameter, replated liner is honed to accurate dimension by removing 0.002 to 0.003 inch of metal. The hard coated treated liners are remanufactured in a similar manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for remanufacturing a cylinder liner which is positioned in a drilling fluid pump during its period of use and which has a chrome iron alloy radial innermost layer therein; comprising the steps of:
   procuring a used liner extracted from a pump cylinder in which the inner diameter is worn from the original liner inner diameter;
   evaluating the inside cyclindrical surface condition of the liner to determine the thickness of metal to be removed from the inner surface;
   aligning the axis of the liner after extraction from the fluid pump with the axis of a metal removal device;
   removing portions of the chrome iron alloy inner surface of the liner by honing or grinding while outside of a pump cylinder to form a cylindrical inner surface in the liner with a diameter enlarged from the original liner inner diameter and finally sized to provide for contact with and reciprocation of a piston therein when said liner is positioned in a pump cylinder; and
   adding sufficient build-up metal to the exterior surface of the cylinder liner to permit a fitting relationship with the pump cylinder upon a determination that the liner outer surfaces have been worn sufficiently to interfere with the fit of liner into the pump cylinder.

2. The process according to claim 1, including the subsequent step of:
   supplying the enlarged diameter liner for use in a fluid pump with a fitted enlarged diameter piston.

3. The process according to claim 1, including the initial step of:
   evaluated the extent of wear on the inner surface of the used cylinder liner while the liner is retained within the pump cylinder.

4. The process according to claims 1, 2 or 3 including after said procuring step the additional step of:

cleaning the exterior and interior surfaces of the extracted cylinder liner; and evaluating the outer diameter surface condition of the liner to determine the fit thereof with the pump cylinder.

5. The process according to claim 1, wherein said step of removing portions of the inner metal surface of the liner is carried out solely by honing.

6. The process according to claim 1, wherein said step of removing portions of the inner metal surface of the liner is carried out by internal grinding.

7. The process according to claim 1, wherein the hard metal alloy inner layer of the cylinder liner is formed by centrifugally casting.

8. The process according to claim 4, wherein said step for cleaning the internal and external surfaces of the cylinder liner is carried out by impinging solid particles against the cylinder liner walls.

9. The process according to claim 4, wherein said step of cleaning the internal and external surfaces of the cylinder liner is carried out by contact with a solvent.

10. The process according to claim 5, wherein said step of aligning the axis of the liner is carried out by mounting the cylinder liner on an internal honing machine, said machine having centering and holding means for retaining said liner.

11. The process according to claim 1, wherein said step of aligning the axis of the liner is carried out by mounting the cylinder liner on an internal honing machine, said machine having centering and holding means for retaining said liner.

12. The process according to claims 1 or 11 wherein said step of removing portions of the interior metal surface is carried out by removing metal to form an inner diameter of about 0.100 inch over the nominal size of the used cylinder liner.

13. The process according to claim 12, wherein the internal diameter of the liner is enlarged to a diameter of from 0.100 to 0.110 inch over the nominal diameter of the used cylinder liner.

14. The process according to claims 1, or 11 wherein said step of removing portions of the inner metal surface of the cylinder liner is carried out by enlarging the inner surface to a diameter within the range of from 3 inches to 8 inches I.D.

15. A process of refitting the cylinder of a drilling fluid pump with a remanufactured cylinder liner having a chrome iron alloy radial innermost layer therein, comprising the steps of:

determining the extent of wear on the inner surface of a cylinder liner while the liner is retained within the pump cylinder;

extracting the worn liner from the pump cylinder when the inner diameter is worn from the original liner inner diameter;

removing portions of the chrome iron alloy inner surface of the liner to form a cylindrical inner surface in the liner with a diameter enlarged from the original liner inner diameter; and inserting the enlarged diameter liner in the cylinder of a drilling fluid pump.

16. The process according to claim 15, including subsequent to said removing step the additional step of supplying the enlarged diameter liner to a drilling fluid pump having a cylinder sized for accepting the enlarged diameter liner.

17. The process according to claim 15, including subsequent to said removing step the additional step of:

supplying a fitted enlarged diameter piston for use with the enlarged diameter liner.

18. The process according to claim 17, including the additional step of:

inserting the enlarged diameter liner into the cylinder of a fluid pump; and fitting an enlarged diameter piston into the enlarged diameter liner when the same is retained within the pump cylinder.

19. The process according to claims 15 or 16 including after said extracting step the additional steps of:

cleaning the exterior and interior surfaces of the extracted cylinder liner; and evaluating the outer diameter surface condition of the liner to determine the fit thereof with the pump cylinder.

20. The process according to claim 19, including the additional steps of:

adding build-up metal to the exterior surface of the cylinder liner upon a determination that the liner outer surfaces have been worn sufficiently to interfere with the fit of the liner into the pump cylinder, and machining the outer surface of the cylinder liner into a fitting relationship with the pump cylinder.

21. The process according to claims 15, 16 or 17 wherein said step of removing portions of the inner metal surface of the liner is carried out by honing.

22. The process according to claims 15, 16 or 17 wherein said step of removing portions of the inner metal surface of the liner is carried out by internal grinding.

23. The process according to claims 15, 16 or 17 wherein the hard metal alloy inner layer of the cylinder liner is formed by centrifugal casting.

24. The process according to claim 15, including the additional step subsequent to said extracting step of aligning the axis of the liner with a surface metal removal device.

25. The process according to claim 24, wherein said step of aligning the axis of the liner is carried out by mounting the cylinder liner on an internal honing or grinding machine, said machine having centering and holding means for retaining said liner.

26. The process according to claims 15 or 24, wherein said step of removing portions of the interior metal surface is carried out by removing metal to form an inner diameter of about 0.100 inch over the nominal size of the used cylinder liner.

27. The process according to claim 26, wherein the internal diameter of the liner is enlarged to a diameter of from 0.100 to 0.110 inch over the nominal diameter of the worn cylinder liner.

28. The process according to claims 15 or 24, wherein said step of removing the portions of the inner metal surface is carried out to obtain a finish smoothness of 16 or less rms.

29. A process of making an improved cylinder liner for use in a drilling fluid pump; comprising the steps of:

procuring a pump liner having a centrifugally cast chrome iron alloy radial innermost layer within which the density of the wear resistant metal layer increases in an outward direction from the inner surface;

aligning the axis of the liner with a surface metal removal device; and removing surface portions of the alloy layer to expose a more dense wear-resistant alloy composition contiguous to the cast metal interface.

30. The process according to claim 29, wherein said step of removing portions of the inner metal surface of the liner is carried out by honing.

31. The process according to claim 29, wherein said step of removing portions of the inner metal surface of the liner is carried out by internal grinding.

32. The process according to claim 29, wherein the wear-resistant metal alloy layer is formed by centrifugal casting.

33. The process according to claim 29, wherein said step of removing portions of the interior metal surface carried out by removing metal to form an inner diameter of about 0.100 inch over the nominal size of the procured pump liner.

34. The process according to claims 29, 30 or 33 wherein said step of removing portions of the inner metal surface of the cylinder liner is carried out by enlarging the inner surface to a diameter within the range of from 3 inches to 8 inches I.D.

35. The process according to claim 29, wherein said step of removing portions of the inner metal surface is carried out to produce a surface finish of no greater than 16 rms.

36. A process of using a cylinder liner having a chrome iron alloy radial innermost layer in a drilling fluid pump in which the density of the wear-resistant innermost layer increases in an outward direction from the inner surface; comprising the steps of:
inserting a liner in the cylinder of a pump;
pumping fluid by the reciprocation of a piston within the liner;
extracting the liner from the pump cylinder when the same has become worn;
aligning the axis of the liner with a metal removal device; and
removing portions of the innermost chrome iron alloy surface of the liner to form an enlarged diameter cylindrical inner surface in the liner and to expose a more dense wear-resistant alloy composition at the surface of the liner.

37. The process according to claim 36, including the subsequent steps of:
supplying the enlarged diameter liner for use in a fluid pump with a fitted enlarged diameter piston; and
refitting the enlarged diameter liner into the cylinder of a fluid pump.

38. The process according to claim 37, including the subsequent steps of:
pumping fluid by the reciprocation of a piston within the enlarged diameter liner;
evaluating the extent of wear on the inner surface of the enlarged cylinder liner; and
extracting the enlarged diameter liner from the pump cylinder when the same has become worn by action of the piston there within.

39. The process according to claim 38, including the subsequent steps of:
aligning the axis of the enlarged diameter liner with a metal removal device; and
removing additional portions of the inner hard metal alloy surface of the liner to form a second enlarged diameter cylindrical inner surface in the liner.

40. The process according to claim 39, including the subsequent steps of:
supplying the second enlarged diameter liner for use in a fluid pump with a fitted enlarged diameter piston.

41. The process according to claims 38, 39 or 40 including the subsequent steps of:
pumping fluid by the reciprocating of a piston within the second enlarged cylinder liner;
evaluating the extent of wear on the inner surface of the worn cylinder liner while the liner is retained within the pump cylinder; and
repeating said steps of aligning the axis of the liner and removing portions of the inner hard metal alloy surface to supply successively enlarged diameter cylindrical inner surfaces in the liner to the extent of the wear-resistant metal alloy inner layer in the liner following sequential pumping cycles.

42. The process according to claims 1, 15, 29 or 36 wherein the drilling fluid pump is a mud pump.

* * * * *